UNITED STATES PATENT OFFICE.

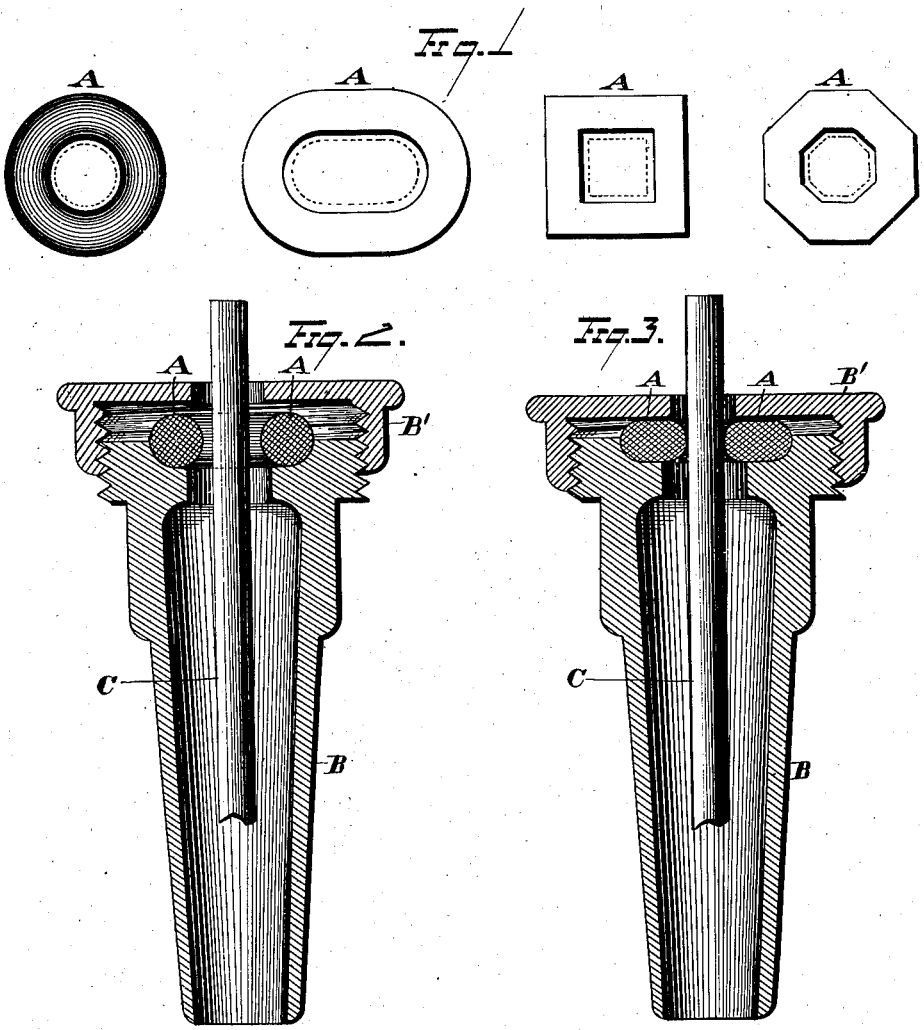

JOHN A. PRINDLE, OF CLEVELAND, OHIO.

IMPROVEMENT IN PACKING FOR RODS OR TUBES.

Specification forming part of Letters Patent No. 214,841, dated April 29, 1879; application filed January 30, 1879.

*To all whom it may concern:*

Be it known that I, JOHN A. PRINDLE, of Cleveland, in the county of Cuyahoga and State of Ohio, have invented certain new and useful Improvements in Packing for Rods or Tubes; and I do hereby declare the following to be a full, clear, and exact description of the invention, such as will enable others skilled in the art to which it pertains to make and use it, reference being had to the accompanying drawings, which form part of this specification.

My invention relates to a packing especially adapted to prevent the escape of fluid or liquid between said packing and the rod or tube passing through it; and it consists, broadly, in an annular, oval, square, or otherwise shaped elastic or yielding body of suitable material, such as rubber, leather, or equivalent substance, adapted, under pressure, to diminish its central opening; second, in an annular or otherwise shaped packing having an opening through it, and constructed from yielding or elastic material, adapted, by pressure, to diminish its opening, and to enlarge said opening when pressure is released; third, in the combination, with a packing, shaped annularly, or in the fashion of a hollow square, triangle, or other figure, of any suitable device for affording a seat or bearing-surface to either one or both of the faces of said packing; fourth, in the combination, with an elastic or yielding packing, shaped annularly, or in the fashion of a hollow square, triangle, or other shape, of a device affording to one or both faces of said packing a seat or bearing-surface. Said device may be so adjustable as that the pressure upon said packing may be regulated as desired.

In the drawings, Figure 1 is a detached view showing my elastic or yielding packing in a variety of shapes. Fig. 2 is a view, in longitudinal section, of my packing as applied to a bung or stopper of a barrel for containing liquid, showing my packing before it is compressed; Fig. 3, the same, showing the packing as compressed and in operation.

While I do not limit the employment of my invention to any specific use, and therefore while not limiting myself to any specific form or construction of said device, I shall, for convenience, describe it as applicable to bungs or stoppers to be used in barrels containing effervescent or gaseous fluids through which a draft-tube is designed to be passed.

A is my packing, constructed entirely or in part of yielding or elastic material, and shaped either annularly or in the fashion of a hollow square, triangle, octagon, or any other desired figure, as shown or intimated in Fig. 1 of the drawings.

The specific shape of my packing constitutes no essential part of my invention, as said shape should always be made to conform to the rod or tube designed to be surrounded by said packing; and of the seat or chamber in which it is to be used.

This packing is made thick enough, so that, by pressure against one or both of its faces, its central opening will be diminished.

There may be instances where a single adjustment of the valve is all that will ever be required; and in such cases, if found desirable, my packing may be constructed simply of yielding non-elastic material, although, for general purposes, I prefer that elasticity shall constitute one of the characteristics of my packing, so that, when the pressure is released, the central opening of the packing will be enlarged practically to its original dimensions—at least sufficiently to loosen it from the tube or rod that it surrounds. When the packing A is placed in a suitable seat or chamber, and pressure is brought to bear upon one or both of its faces, it will firmly and completely close upon any tube or rod passing through its central opening in such a manner as to effectually prevent the escape of fluid or liquid between said packing and tube.

As shown in Figs. 2 and 3, B B' represent the elements constituting a bung, the part B being the tapering body, and B' an adjustable cap or top screwed into or upon the body B. An opening through the cap B' admits of the introduction of a draft-tube, C, which passes down through the central opening of the packing A. The parts B B' of the bung are so constructed as to afford a seat or bearing-surface to either one or both sides of the packing A.

As shown in Fig. 2 of the drawings, the cap B' is exerting no pressure upon the packing A, and in this condition the central opening of said packing is sufficiently large to admit of the ready passage of the tube C through it; but when the cap B' is screwed down, as shown in Fig. 3 of the drawings, in such a manner as to bring pressure upon the faces of the packing A, then the central opening of said packing A is diminished, and it now tightly embraces the tube C in such a manner as to effectually prevent any escape of fluid or liquid in this locality, while, at the same time, on account of the elasticity or yielding character of the packing, escape of liquid or fluid is likewise prevented around its seat or bearing-surfaces.

It will be evident that my packing is adaptable to a great variety of devices—in fact, to any where the escape of fluid or liquid around a rod or tube is wished to be prevented; and any device will be comprehended by my invention that employs an elastic or yielding packing, shaped annularly, or in the fashion of a hollow square, triangle, octagon, or other shape, and provided with any contrivance for exerting pressure upon one or both of the faces of said packing, whereby the diameter of its central opening may be regulated, as above specified.

Besides the abstract advantage as a packing that I have accomplished by my device, it possesses the additional recommendation of quick, easy, and reliable adjustment.

If it is found that there is a leakage between the tube or rod C and its surrounding packing A, a slight adjustment of the cap B', or its equivalent, whereby a little additional pressure is brought to bear upon the packing A, will be sufficient to correct the difficulty.

Another advantage is this, that when the packing is once tight enough any additional pressure from within the container will only serve to tighten the packing.

What I claim is—

The combination, with a recessed seat surrounding the opening to be packed, of a packing constructed from suitable yielding or elastic substance, and fashioned in the shape of a ring, hollow square, octagonal, or equivalent form, and a follower for subjecting the packing to compression on one side thereof, whereby, the outer periphery of said packing being held against lateral expansion, the material thereof will be expanded inwardly and pack the rod located in the center of the packing, substantially as set forth.

In testimony whereof I have signed my name to this specification, in the presence of two subscribing witnesses.

JOHN A. PRINDLE.

Witnesses:
  JNO. CROWELL, Jr.,
  WILLARD FRACKER.